United States Patent [19]
Yokotani et al.

[11] Patent Number: 5,789,925
[45] Date of Patent: Aug. 4, 1998

[54] SENSOR SYSTEM HAVING ABNORMALITY DETECTING CIRCUIT FOR DETECTING ABNORMALITY OF SENSOR SYSTEM FROM OUTPUTS OF SIGNAL PROCESSING CIRCUITS

[75] Inventors: Masahiro Yokotani; Wataru Fukui; Naoki Hiraoka; Shunichi Wada, all of Tokyo, Japan

[73] Assignee: Mitsubishi Denki Kabushiki Kaisha, Tokyo, Japan

[21] Appl. No.: 674,758

[22] Filed: Jul. 2, 1996

[30] Foreign Application Priority Data

Dec. 28, 1995 [JP] Japan .................. 7-342134

[51] Int. Cl.$^6$ .......... G01R 31/02; G08B 29/00; G01B 7/30; G01P 3/42
[52] U.S. Cl. .......... 324/500; 324/166; 324/207.21; 324/537; 318/563; 340/508; 340/653
[58] Field of Search .......... 324/160–163, 324/166, 173, 174, 207.2, 207.21–207.25, 500, 503, 537, 538, 555, 556, 771; 340/506–508, 514, 652, 653; 364/551.01; 318/563, 564

[56] References Cited

U.S. PATENT DOCUMENTS

| | | | |
|---|---|---|---|
| 3,735,250 | 5/1973 | Masui | 324/543 |
| 4,769,597 | 9/1988 | Sano | 324/207.25 |
| 4,783,631 | 11/1988 | Nakashima et al. | 324/160 X |
| 4,886,136 | 12/1989 | Kozuka et al. | 180/79.1 |
| 4,968,943 | 11/1990 | Russo | 324/537 |
| 4,972,095 | 11/1990 | Oka et al. | 324/166 X |
| 5,101,155 | 3/1992 | Oehler et al. | 324/160 X |
| 5,218,298 | 6/1993 | Vig | 304/207.2 X |
| 5,247,245 | 9/1993 | Nelson | 324/537 X |
| 5,394,341 | 2/1995 | Kepner | 324/537 X |
| 5,451,867 | 9/1995 | Loreck et al. | 324/166 |
| 5,510,706 | 4/1996 | Good | 324/166 |
| 5,510,707 | 4/1996 | Caron | 324/166 |
| 5,585,775 | 12/1996 | Ishishita | 324/207.21 X |
| 5,619,131 | 4/1997 | Lelle et al. | 324/174 |

Primary Examiner—Gerard R. Strecker
Attorney, Agent, or Firm—Sughrue, Mion, Zinn, Macpeak & Seas, PLLC

[57] ABSTRACT

A sensor system includes a single sensor means, two sensed signal processing circuits for processing the output signal of the sensor means, both the signal processing circuits being substantially equal in circuit construction, and an abnormality detecting circuit for detecting an abnormality on the basis of the difference between the output signals of the two sensed signal processing circuits.

17 Claims, 2 Drawing Sheets

SENSOR SYSTEM HAVING ABNORMALITY DETECTING CIRCUIT FOR DETECTING ABNORMALITY OF SENSOR SYSTEM FROM OUTPUTS OF SIGNAL PROCESSING CIRCUITS

BACKGROUND OF THE INVENTION

The present invention relates to a sensor system with an abnormality detecting means for system reliability improvement, carried on an automobile, and a sensor.

FIG. 2 is a circuit diagram showing a conventional sensor system.

In the figure, reference numeral 3 designates a sensor circuitry 3, and 4, an ECU (electronic control unit). Numeral 5 designates a first sensor means (corresponding to a sensor element 1 in FIG. 2). The sensor element 1 is provided in opposition to a magnet, which is mounted on a shaft (rotary shaft) of an automobile, such as a steering shaft or a crank shaft. The sensor element 1 senses a change of a magnetic field caused by the magnet, to detect a rotation angle of the shaft. Numeral 6 designates a second sensor means (corresponding to a sensor element 2 in FIG. 2). The second sensor means 6 is coupled in parallel with the first sensor means 5, and disposed in opposition to the shaft, and produces a signal similar to the output signal of the first sensor means 5.

Numeral 7 designates a first differential amplifier circuit for differentially amplifying the output signal of a bridge circuit (i.e., a differential signal comprising first and second signals from two different points in the bridge circuit, as shown in FIG. 2), including the first sensor element; 8, a second differential amplifier circuit for differentially amplifying the output signal of a bridge circuit including the second sensor element; and 9 to 14, wires interconnecting the sensor circuitry 3 and the ECU 4. Of these wires, the wire 9 is denoted as first Vcc (corresponding to Vcc1 in FIG. 2); the wire 10, as first Vout (corresponding to Vout1 in FIG. 2); the wire 11, as first GND (corresponding to GND1 in FIG. 2); the wire 12, as second Vcc (corresponding to Vcc2 in FIG. 2); the wire 13, as second Vout (corresponding to Vout2 in FIG. 2); and the wire 14, as GND2 (corresponding to GND2 in FIG. 2).

The first Vcc 9 is a line for supplying a power source at a preset voltage to the first sensor element 5. The first Vout 10 is a line interconnecting the first differential amplifier circuit 7, a comparator circuit 15 (to be described later), and a CPU 16 (to be described later). The first GND 11 is a ground wire. The second Vcc 12 is a line for supplying a power source at a preset voltage to the second sensor element 6. The second Vout 13 is a line for interconnecting the second differential amplifier circuit 8 and the comparator circuit 15 (to be described later). The second GND 14 is a second ground wire.

Reference numeral 15 indicates a comparator circuit for comparing the output signals of the first differential amplifier circuit 7 and the second differential amplifier circuit 8. A signal (corresponding to a signal "fail" in FIG. 2) outputted from the comparator circuit 15 represents an abnormality of the system. Numeral 16 indicates a CPU which receives a signal of the first Vout outputted from the first differential amplifier circuit 7 and a signal (abnormality signal) from the comparator circuit 15, and controls an engine, for example, in accordance with those signals received.

The operation of the sensor system thus constructed will be described.

The sensor circuitry 3 includes two separate sensors which are independent of each other. The first sensor is supplied with a power source through the power source lines, the first Vcc 9 and the first GND 11. The second sensor is supplied with a power source through the power source lines, the second Vcc 12 and the second GND 14. The output signal of the first sensor element 5 is amplified by the first differential amplifier circuit 7, and applied to the ECU 4 by way of the first Vout 10. The output signal of the second sensor element 6 is amplified by the second differential amplifier circuit 8. In the ECU 4, the CPU 16 controls a device, not shown, using the received signal.

When the first differential amplifier circuit 7 fails to operate properly, the output signal of the first differential amplifier circuit 7 is abnormal. In this case, the difference between the output signals of the first and the second differential amplifier circuits 7 and 8 exceeds a predetermined value. The difference is detected by the comparator circuit 15 in the ECU 4. If the comparator detects the excessive difference, the comparator outputs an abnormality signal to the CPU 16. When receiving the abnormality signal, the CPU 16 recognizes that the output signal of the first differential amplifier circuit 7 is abnormal.

When the line interconnecting the sensor circuitry 3 and the ECU 4 is in abnormal, the comparator circuit 15 outputs an abnormality signal to the CPU 16, and the CPU 16 recognizes that the output signal of the first differential amplifier circuit 7 is abnormal.

When the first Vcc 9 or the second Vcc 12 is disconnected, the output signal of the first differential amplifier circuit 7 or the second differential amplifier circuit 8 is at ground potential. Then, the comparator circuit 15 produces an abnormality signal. When the first GND 11 or the second GND 14 is disconnected, the output signal of the first differential amplifier circuit 7 or the second differential amplifier circuit 8 is at the potential Vcc. Then, the comparator circuit 15 produces an abnormality signal.

The CPU 16 stops its control when the output signal of the first differential amplifier circuit 7 is abnormal. In this way, an erroneous control by the CPU 16 is prevented.

Thus, the conventional sensor system uses the dual sensing systems. Therefore, the number of the lines interconnecting the sensor circuitry 3 and the ECU 4, and the number of the component parts used in the sensor circuitry 3 are large. This results in complexity of the construction and increase of the cost to manufacture.

Where the construction of the sensor system is simplified, it can not be expected to produce an accurate abnormality detection in the sensor system.

SUMMARY OF THE INVENTION

The present invention has been made in view of the above circumstances and has an object to provide a sensor system which reliably detects an abnormality thereof, with a simple construction and low cost to manufacture.

To achieve the above object, there is provided a sensor system comprising: a single sensing means; first and second signal processing means for processing a signal outputted from the sensing means; abnormality detecting means for detecting an abnormality of the first signal processing means on the basis of the difference between the output signals of the first and second signal processing means; and control means for controlling another device on the basis of the output signals of the first processing means and the abnormality detecting means.

In the sensor system, the abnormality detecting means includes comparing means for comparing the output signals of the first and the second signal processing means, and a transistor connected to the detecting means.

In the sensor system, the emitter and the collector terminals of the transistor are connected to power source lines for supplying an electric power to the sensing means, and the output terminal of the comparing means is connected to the base of the transistor.

In the sensor system, the sensing element is a magnetoresistance element or a Hall element.

In the above sensor system, the sensing means, and the first and the second signal processing means are mounted on a circuit board, and the control means is mounted on another circuit board.

A plural number of terminals are provided which are for transmitting the output signal of the first signal processing means from the circuit board on which the sensing means, and the first and the second signal processing means are mounted, to the control means.

According to a further aspect of the present invention, there is provided a sensor comprising: a single sensing means; first and second signal processing means for processing a signal outputted from the sensing means; abnormality detecting means for detecting an abnormality of the first signal processing means on the basis of the difference between the output signals of the first and second signal processing means; and output terminals for outputting the output signal of the first signal processing means, and an output terminal for outputting the output signal of the abnormality detecting means to exterior.

In the above sensor, the abnormality detecting means includes comparing means for comparing the output signals of the first and the second signal processing means, and a transistor connected to the detecting means.

BRIEF DESCRIPTION OF THE DRAWINGS

Other features and advantages of the invention will be apparent from the following description taken in connection with the accompanying drawings, in which.

DETAILED DESCRIPTION OF THE PREFERRED EMBODIMENTS

An embodiment of the present invention will be described with reference to the accompanying drawing.

Figure 1:
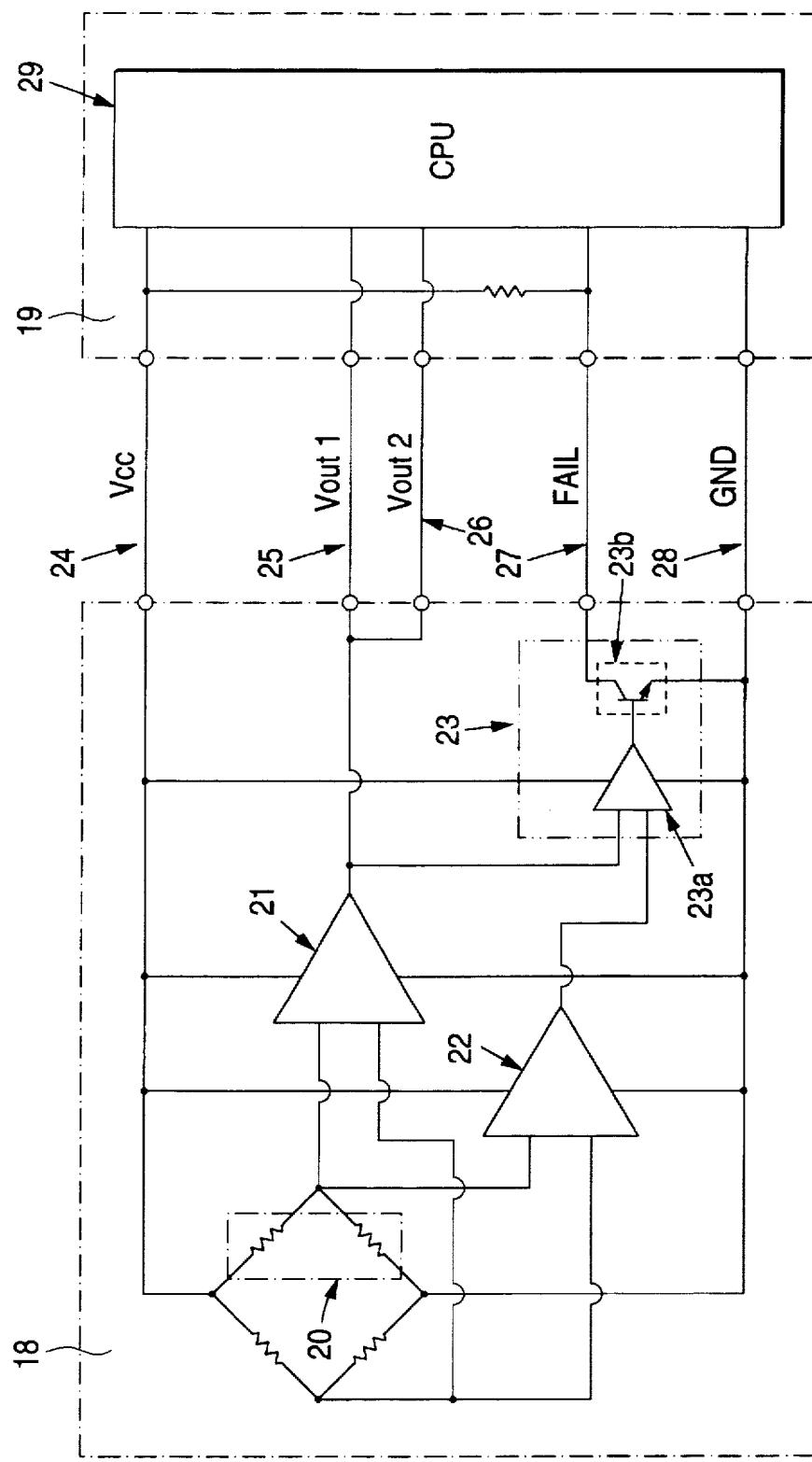
FIG. 1 is a circuit diagram showing a sensor system according to an embodiment of the present invention.
Figure 2:
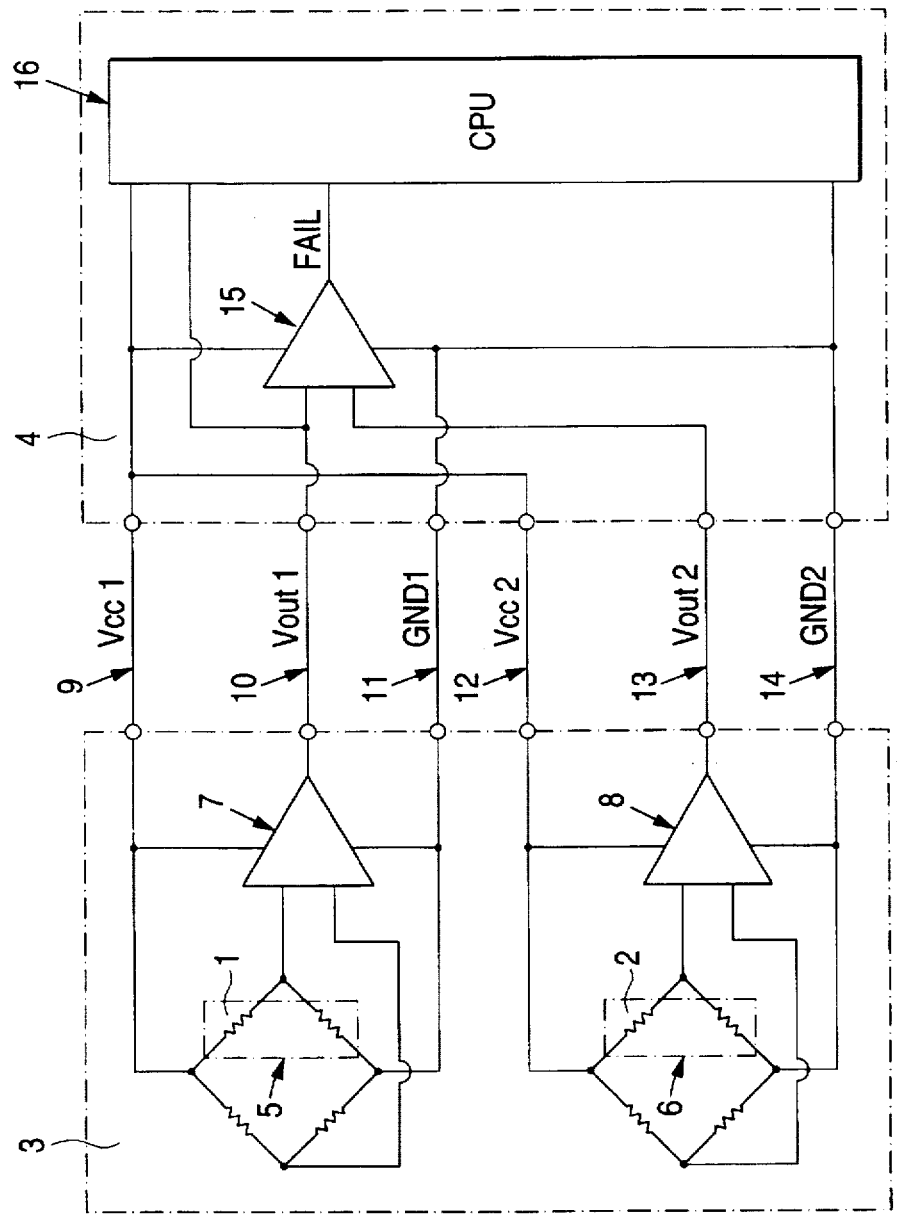
FIG. 2 is a circuit diagram showing a conventional sensor system.

FIG. 1 is a circuit diagram showing a sensor system according to an embodiment of the present invention.

In the figure, reference numeral 18 designates a sensor circuitry as sensor means, and 19, an ECU as control means. The sensor circuitry 18 is mounted on a circuit board, and the ECU 19, on another circuit board. Numeral 20 designates a sensor element as sensor means which partially forms a bridge circuit. As shown in FIG. 1, the bridge circuit provides a differential output signal comprising a first output signal at one point and a second output signal at a second point. Each of the first and second output signals is provided to differential amplifier circuits 21 and 22, as shown in FIG. 1. The sensor element 20 is disposed in opposition to a magnet mounted on a rotary shaft, not shown. The sensor element 20 senses a change of the magnetic field caused by the magnet. A rotation angle or the number of revolutions of the rotary shaft is detected on the basis of the signal outputted from the sensor element 20.

Reference numeral 21 designates a main differential amplifier circuit as first processing means; 22, a subordinate differential amplifier circuit 22 as second processing means; 23, an abnormality detecting circuit (fail detecting circuit in FIG. 1) as abnormality detecting means mainly for detecting an abnormality of the main differential amplifier circuit 21; 23a, a comparator circuit as comparing means; and 23b, a transistor 23b. The transistor 23b is connected at the base terminal to the output of the comparator circuit 23a, at the collector terminal to a Vcc 24 (to be described later) and a CPU 29 (to be described later), and at the emitter terminal to a GND 28 (to be described later). The comparator circuit 23a compares two signals inputted thereto. If the difference between the signals is in excess of a predetermined value (reference value), the comparator circuit 23a produces a signal.

Reference numerals 24 to 28 designate wires interconnecting the sensor circuitry 18 and the ECU 19. Of these wires 24 to 28, the wire 24 denoted as Vcc is a power source line for applying a preset voltage from the ECU 19 to the sensor circuitry 18. The wire 25 as a first Vout (Vout 1 in FIG. 1) is a signal line for supplying the output signal of the main differential amplifier circuit 21 to the ECU 19. The wire 26 as a second Vout (Vout 2 in FIG. 1) is another signal line provided in addition to the signal line of the first Vout. The wire 27 denoted as fail is a signal line for supplying the output signal of the abnormality detecting circuit 23 to the ECU 19. The wire 28 denoted as GND is a ground wire connected to ground. The GND 28 and the Vcc 24 serve as power source lines for supplying an electric power to the sensor circuitry 18. Since the wires 24 to 28 are extended between the sensor circuitry 18 and the ECU 19, those wires sometimes receive noise or suffer from disconnection. It is necessary to detect the noise and the disconnection by the abnormality detecting circuit 23.

The sensor circuitry 18 and the ECU 19 are provided with input and output terminals, which are connected to those wires.

Reference numeral 29 designates a CPU in the ECU 19. The CPU 29 receives the output signal of the main differential amplifier circuit 21, through the first Vout 25 or the second Vout 26. The CPU 29 controls an engine (not shown), for example, on the basis of the output signal of the main differential amplifier circuit 21.

The signal that is inputted to the CPU 29 and used for the control is the output signal of the main differential amplifier circuit 21. The output signal of the subordinate differential amplifier circuit 22 is not used for the control. Where the sensor element 20 consists of an element producing a very weak signal, such as a magnetoresistance element or a Hall element, the main differential amplifier circuit 21 must be of the high precision type, and particularly has a small offset of the output value and is insensitive to a temperature variation. The output signal of the subordinate differential amplifier circuit 22 is applied to only the abnormality detecting circuit 23, and is not used for the control by the CPU 29. Therefore, the subordinate differential amplifier circuit 22 may be a low precision differential amplifier. Use of such an amplifier leads to simplification of the differential amplifier per se. The comparator circuit 23a produces an abnormality signal when the difference between the output signals of the main differential amplifier circuit 21 and the subordinate differential amplifier circuit 22 is larger than a preset reference value. The reference value is determined in connection with the offset value and the temperature characteristic value of the subordinate differential amplifier circuit 22. The main differential amplifier circuit 21 must be a high precision differential amplifier, while the subordinate differential amplifier circuit 22 may be a differential amplifier having such a precision as to correspond to the reference value set for the comparator circuit 23a.

The power supply system to the sensor circuitry 18 consists of a single power supply system including the Vcc 24 and the GND 28. A reliable sensing element, such as a magnetoresistance element or a Hall element, may be used for the sensor element 20 since a change of the magnetic field can be sensed in a noncontact manner.

A dual signal path consisting of two signal lines, the first Vout 25 and the second Vout 26, is employed for transmitting the output signal of the main differential amplifier circuit 21 to the ECU 19. Use of the dual signal path insures safety if one of the wires should be disconnected.

The operation of the sensor system thus constructed will be described.

An abnormal output signal of the sensor circuitry 18 is detected through the comparison of the output signals of the main differential amplifier circuit 21 and the subordinate differential amplifier circuit 22 by the comparator circuit 23a in the abnormality detecting circuit 23. The output signal of the sensor circuitry 18 is abnormal, for example, when the main differential amplifier circuit 21 fails to operate properly or when noise is introduced into the output lines, the first Vout 25 and the second Vout 26.

The output signals of the main differential amplifier circuit 21 and the subordinate differential amplifier circuit 22 are inputted to the comparator circuit 23a in the abnormality detecting circuit 23. When the difference between the output signals exceeds a preset value, an abnormality signal of high level appears at the open collector of the transistor 23b in the abnormality detecting circuit 23, and is transmitted to the ECU 19 through the fail 27.

If, of the lines interconnecting the sensor circuitry 18 and the ECU 19, the line for supplying the electric power from the ECU 19 to the sensor circuitry 18, for example, the power line Vcc 24 or GND 28 is abnormal, a high signal, or an abnormality signal, appears at the open collector of the transistor 23b of the abnormality detecting circuit 23.

The CPU 29 controls an engine, a power steering or the like by using the output signal of the main differential amplifier circuit 21. When receiving an abnormality signal through the fail 27, the CPU 29 decides that the output signal of the main differential amplifier circuit 21 is abnormal. At this time, the CPU 29 stops its control. Accordingly, an erroneous control by the CPU 29 will not be carried out.

The sensor system of the present embodiment allows a sensor element of the noncontact type to be used for the sensor element 20. The sensor system is operable, with the single sensor 20. This feature contributes to reduction of the number of required parts. The subordinate differential amplifier circuit 22 for the abnormality detection may be constructed with a simple differential amplifier. This leads to cost reduction and increase of reliability.

The output signal of the main differential amplifier circuit 21 is led out of the sensor circuitry 18 through the signal lines, the first Vout 25 and the second Vout 26. Accordingly, there is a chance that noise is superposed on the signals flowing through the signal lines. If the noise is superposed, an abnormal signal is issued for the ECU 19, from the sensor circuitry 18. On the other hand, the output signal of the subordinate differential amplifier circuit 22 is not led outside out of the sensor circuitry 18. Accordingly, there is no chance that it suffers from noise. For this reason, if some abnormality takes place in the sensor system, a difference is sure to be caused between the output signals of the main differential amplifier circuit 21 and the subordinate differential amplifier circuit 22. A reliable abnormality detection by the abnormality detecting circuit 23 is ensured.

The dual signal path consisting of the first Vout 25 and the second Vout 26 is used for transmitting the signal from the sensor circuitry 18 to the ECU 19. Accordingly, if one of the signal lines is disconnected or its terminal improperly comes in contact with something, the signal transmission to the ECU 19 is secured.

With provision of the transistor 23b within the abnormality detecting circuit 23, other abnormality, e.g., wire disconnection, than the abnormality detected by the comparator circuit 23a can be detected. It is noted that the base terminal of the transistor 23b is connected to the output terminal of the comparator circuit 23a, and the collector and the emitter terminals thereof are connected to the power source lines, the Vcc 24 and the GND 28. With this connection of the transistor, it is possible to detect disconnection, short-circuiting and the like of the power source lines.

The sensor system of the embodiment detects a rotation angle of the rotary shaft. In an alternative, a magnet is mounted on a shaft that is linearly movable. A change of the linear motion of the shaft is sensed by the sensing element. Any of other physical quantities may be sensed.

The sensor system of the embodiment is used for sensing a rotation angle of the steering shaft of an automobile, which requires a high reliability for the sake of safety. It is evident, however, that the sensor system of the present invention will find any other application than to the automobile.

What is claimed is:

1. A sensor system comprising:

a sensing means;

first signal processing means receiving and processing a signal outputted from said sensing means and producing, with a first precision, a first output signal;

second signal processing means receiving and processing said signal outputted from said sensing means and producing, with a second precision which is less than the first precision, a second output signal;

abnormality detecting means, receiving said first and second output signals, for detecting an abnormality of said first signal processing means on the basis of a difference between said first and second output signals and for producing an abnormality signal indicating whether an abnormality has been detected; and control means, receiving said first output signal and said abnormality signal, for controlling another device on the basis of the first output signal and said abnormality signal.

2. The sensor system according to claim 1, wherein said abnormality detecting means includes comparing means for comparing the first and second output signals, and a transistor receiving at one terminal an output of said detecting means, wherein a state of a signal at another terminal of said transistor varies based on the output of said comparing means to produce said abnormality signal.

3. The sensor system according to claim 2, wherein an emitter terminal and a collector terminal of said transistor are connected to power source lines for supplying an electric power to said sensing means, and an output terminal of said comparing means is connected to a base terminal of said transistor.

4. The sensor system according to claim 2, wherein said sensing element is a magnetoresistance element or a Hall element.

5. The sensor system according to claim 1, wherein said sensing means, and said first and said second signal processing means are mounted on a circuit board, and said control means is mounted on another circuit board.

6. The sensor system according to claim 5, wherein a plural number of terminals are provided which are for transmitting the output signal of said first signal processing means from the circuit board on which said sensing means, and said first and said second signal processing means are mounted, to said control means.

7. A sensor device comprising:

a sensing means;

first signal processing means receiving and processing a signal outputted from said sensing means and producing, with a first precision, a first output signal;

second signal processing means receiving and processing said signal outputted from said sensing means and producing, with a second precision which is less than the first precision, a second output signal;

abnormality detecting means, receiving said first and second output signals, for detecting an abnormality of said first signal processing means on the basis of the difference between said first and second output signals and for producing an abnormality signal indicating whether an abnormality has been detected;

an output terminal for outputting said first output signal; and an output terminal for outputting said abnormality signal.

8. The sensor system according to claim 7, wherein said abnormality detecting means includes comparing means for comparing the first and second output signals, and a transistor receiving at one terminal an output of said detecting means, wherein a state of a signal at another terminal of said transistor varies based on the output of said comparing means to produce said abnormality signal.

9. A sensor system, comprising:

a sensor sensing a state of a device and generating a detection signal indicating the state of the device;

a first amplifier receiving and amplifying said detection signal to produce, with a first precision, a first amplified signal;

a second amplifier receiving and amplifying said detection signal to produce, with a second precision which is less than the first precision, a second amplified signal;

a comparator circuit receiving said first and second amplified signals and producing an abnormality signal which indicates that an abnormal condition of the sensor system exists when a difference between said first and second amplified signals exceeds a predetermined threshold; and a processor receiving said first amplified signal and said abnormality signal and controlling the state of the device on the basis of the first amplified signal and said abnormality signal.

10. The sensor system according to claim 9, wherein said comparator circuit includes a comparator which compares the first and second amplified signals and a transistor receiving at one terminal an output of said comparator, wherein a state of a signal at another terminal of said transistor varies based on the output of said comparator to produce said abnormality signal.

11. The sensor system according to claim 9, wherein:

said detection signal comprises first and second signals;

said first amplifier is a differential amplifier which receives said first and second signals and differentially amplifies said detection signal; and said second amplifier is a differential amplifier which receives said first and second signals and differentially amplifies said detection signal.

12. The sensor system according to claim 1, wherein said abnormality detecting means detects said abnormality when the difference between said first and second output signals exceeds a reference value, wherein the reference value corresponds to the second precision.

13. The sensor system according to claim 1, wherein: said first signal processing means is a first differential amplifier; said second signal processing means is a second differential amplifier; and said abnormality detecting means receives said first and second output signals directly from said first and second differential amplifiers.

14. The sensor system according to claim 7, wherein said abnormality detecting means detects said abnormality when the difference between said first and second output signals exceeds a reference value, wherein the reference value corresponds to the second precision.

15. The sensor system according to claim 7, wherein: said first signal processing means is a first differential amplifier; said second signal processing means is a second differential amplifier; and said abnormality detecting means receives said first and second output signals directly from said first and second differential amplifiers.

16. The sensor system according to claim 9, wherein said predetermined threshold corresponds to the second precision.

17. The sensor system according to claim 9, wherein: said first amplifier is a first differential amplifier; said second amplifier is a second differential amplifier; and said comparator circuit receives said first and second amplified signals directly from said first and second differential amplifiers.

* * * * *